UNITED STATES PATENT OFFICE.

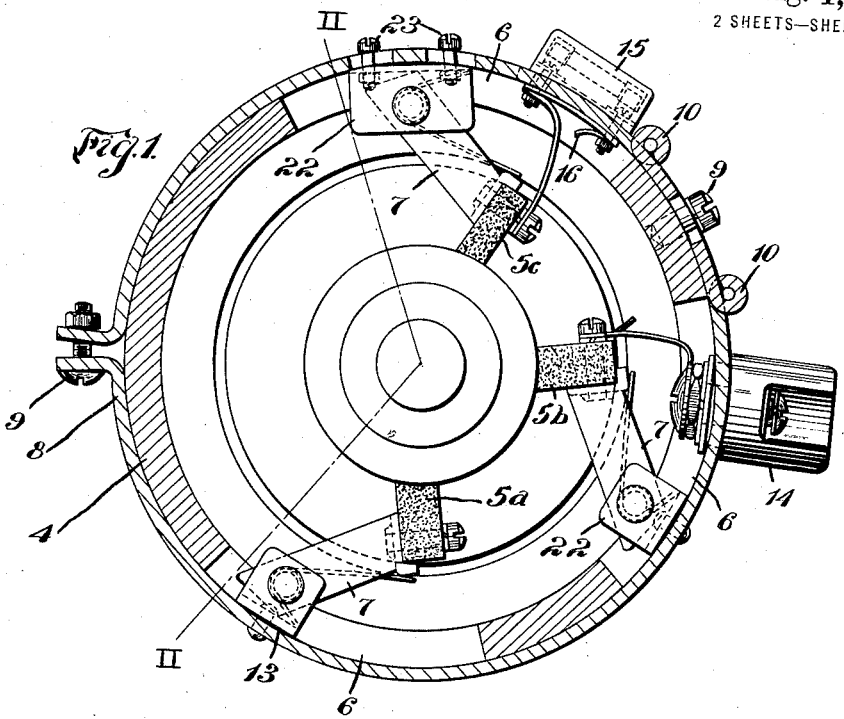
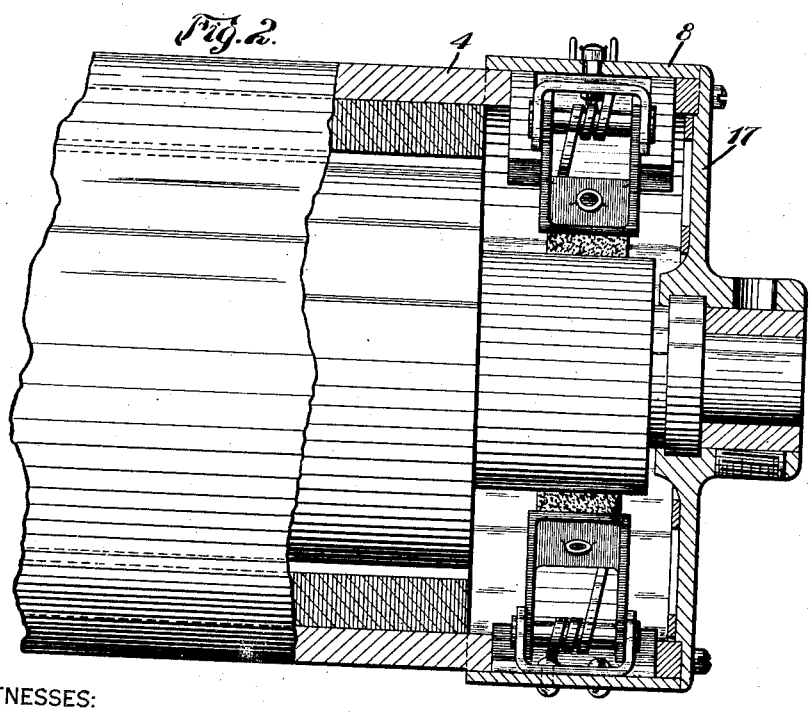

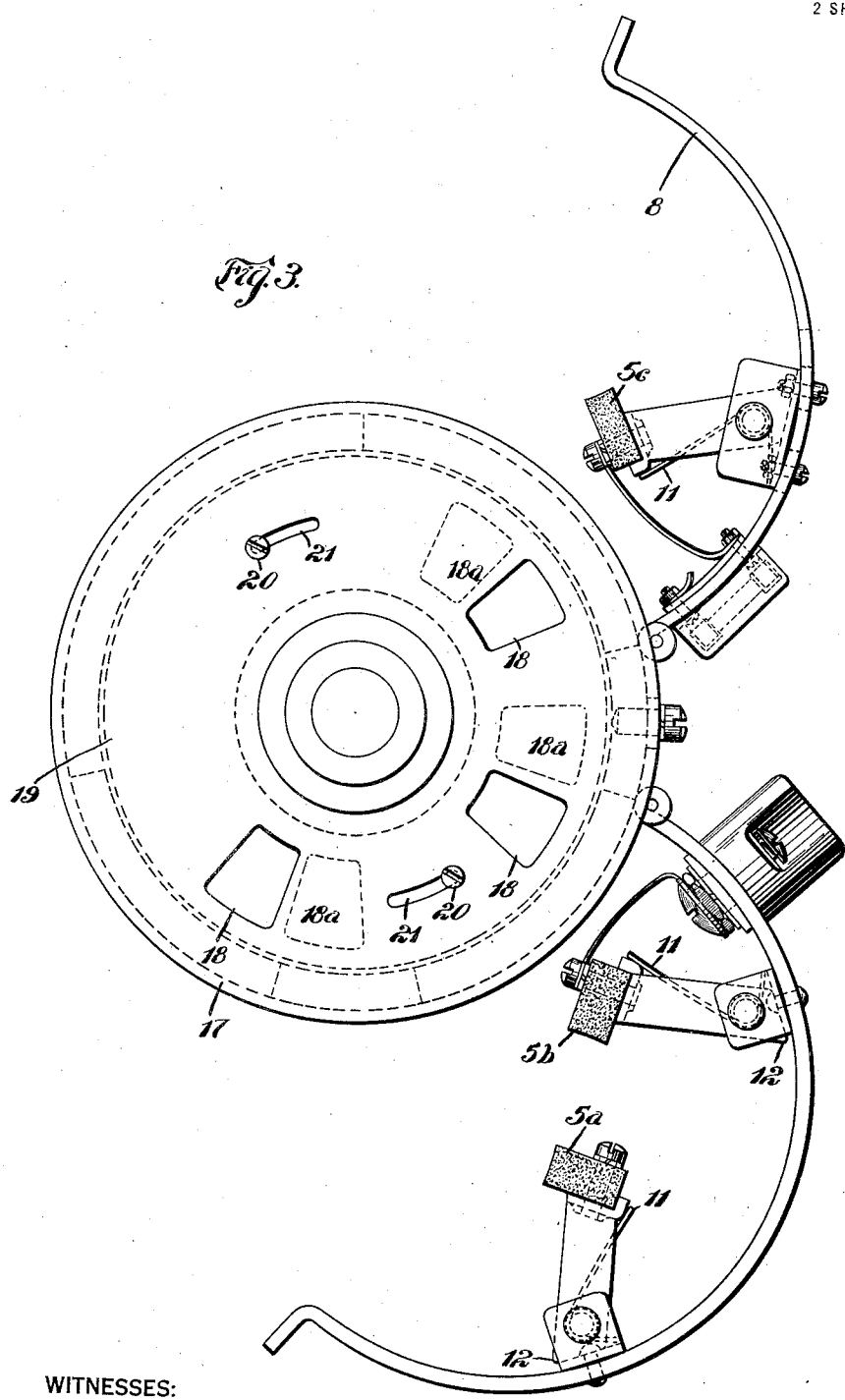

JOHN E. TROSTLE, OF WILKINSBURG, PENNSYLVANIA, ASSIGNOR TO WESTINGHOUSE ELECTRIC & MANUFACTURING COMPANY, A CORPORATION OF PENNSYLVANIA.

BRUSH HOLDER.

1,424,326. Specification of Letters Patent. Patented Aug. 1, 1922.

Application filed July 7, 1920. Serial No. 394,461.

*To all whom it may concern:*

Be it known that I, JOHN E. TROSTLE, a citizen of the United States and a resident of Wilkinsburg, in the county of Allegheny and State of Pennsylvania, have invented a new and useful Improvement in Brush Holders, of which the following is a specification.

My invention relates to brush holders and it has for its object the provision of means whereby commutator brushes are mounted in such manner as to be easily accessible for the purposes of inspection, repairs, or replacement.

In various types of dynamo-electric machines—particularly those with an enclosing casing such as are used in connection with automobiles—commutator brushes of the swivel type are carried by the end bracket that is bolted on the end of the generator casing. In order to make adjustments or inspection of the brushes, it has been necessary to unbolt and remove the end bracket with the brushes carried thereon. This requires a great deal of time, especially in the factory preparatory to shipping the genenator, when it has to be inspected, tested and adjusted many times before it can be finally approved.

By my construction, I provide means whereby the commutator brushes of an enclosed generator or motor may be inspected for sparking, without removing any part of the casing, and, also, means whereby the brush holders may be quickly and easily lifted out of the casing for repairs or replacement. As shown in the accompanying drawings—

Fig. 1 is a cross sectional view showing the manner in which the brush holders are supported; Fig. 2 is a partial sectional view taken on the line II—II of Fig. 1, and Fig. 3 is an end view of the generator casing showing the supporting bracket for the brushes in open position.

In those portions of a generator casing 4 which are opposite commutator bruhes 5ª, 5ᵇ and 5ᶜ, I provide openings 6 to permit the passage therethrough of brush holders 7 that are carried on a bracket 8. This bracket surrounds the casing 4 to cover the openings 6 and is fastened to the casing by a machine screw 9. The bracket has two hinged portions normally held in closed position by the bolt 9 and has hinges 10 about which they move to open position.

Each of the brushes is carried by a brush holder 7 pivotally mounted on the bracket 8 and spring-held against the commutator bars by springs 11.

To maintain the brush holders in extended position when the brushes are swung out of contact with the commutator, I provide them with projecting portions 12 which abut against the bracket 8 or the base of lugs 22, which arrangement, while allowing a reasonable amount of movement, overcomes the tendency of the springs 11 to force the brushes against the wall of the bracket when it is in open position. The brushes are thus always in proper position for contact with the commutator bars when the bracket is being moved to closed position.

The brush 5ª is grounded to the cover at 13, brush 5ᵇ is connected to a terminal 14, and brush 5ᶜ is connected through a fuse block 15 to the terminal 16 of the field magnet winding in the usual manner. The brushes 5ᵇ and 5ᶜ are insulated from the bracket and generator casing, by reason of the fact that the lugs 22 carrying the brush holders 7 are of non-conducting material, such as micarta.

The bracket 8, at the point where the machine screw 9 passes through it, is slotted to permit circumferential adjustment of the brushes 5ª and 5ᵇ with respect to the field coils; and is likewise slotted at the points where the bolts 23 pass through it, to permit adjustment of the brush 5ᶜ with respect to brushes 5ª and 5ᵇ. The brushes must be mounted at such positions on the commutator as will insure the proper voltage for the service for which the generator is employed.

Referring now especially to Fig. 3, it will be seen that in the end plate or bracket 17 of the generator casing 4, I provide three cut-out portions 18 so arranged that each will lie opposite one of the brushes when in operative position, and permit the attendant to observe through the openings the action of the brushes as regards sparking, etc.

Mounted on the inner face of the end plate is a washer or disk member 19, provided with openings 18ª to correspond with those in the end plate. The washer is carried on the end bracket by means of pins or screws 20 engaging with curved slots 21 in the end bracket. The pins 20 have free sliding engagement with the slots, and when moved therein rotate the washer to bring the openings 18 and 18ª into or out of register, as may be desired.

Although my invention is described as applied to an automobile lighting generator, its field of application is not so limited, but it might be used in various other types of generators and in motors.

I claim as my invention:

1. In a machine of the class described, the combination of a perforated casing, a commutator, brushes normally in contact with said commutator, a bracket pivotally mounted on the casing and adapted to normally close said perforations, supporting means for the brushes carried by said bracket and extending through the perforations in said casing, and means whereby the bracket may be moved outwardly to withdraw the brushes through said perforations.

2. In a machine of the class described, the combination of a perforated casing, a perforated end plate therefor, closure means for the perforations in the end plate, a commutator, brushes normally in contact with said commutator, a bracket mounted on the casing, supporting means for the brushes carried by said bracket and extending through the perforations in the casing, and means whereby the bracket may be moved outwardly to withdraw the brushes through said perforations.

3. In a machine of the class described, the combination of an enclosing casing, a commutator, brushes normally in contact with said commutator, a bracket secured to the casing and comprising a plurality of hinged sections, and brush supporting means secured to said hinged portions and movable therewith.

4. In a machine of the class described, the combination of an enclosing casing, a commutator, brushes normally in contact with said commutator, a bracket secured to the casing and comprising a plurality of hinged sections, brush supporting means secured to said hinged portions and movable therewith, a perforated end plate for said casing, and means for closing said perforations in the end plate.

5. In a machine of the class described, the combination of a perforated enclosing casing, a commutator, brushes normally in contact with said commutator, a bracket secured to the casing and comprising a plurality of hinged sections, and brush supporting means secured to said hinged portions and movable therewith through said perforations in the casing.

6. The combination with a rotor element, of brushes co-operating therewith, a casing normally enclosing said brushes, circumferentially adjustable and radially movable supporting means for said brushes, and pivotally mounted means for moving said brushes from cooperative relation with said rotor to a position exterior to said casing.

7. The combination with a rotor element, of a perforated enclosing casing therefor, brushes normally in contact with said rotor, and pivotal supporting means normally closing said perforations for removing said brushes through the perforation in said casing.

8. The combination with a rotor element, of a perforated enclosing casing therefor, brushes normally in contact with said rotor, and pivotally mounted supporting means for removing said brushes through the perforations in said casing and normally closing said perforations, and means for maintaining said brushes in substantially proper radial alinement when removed from contact with said rotor.

9. In a machine of the class described, the combination of an enclosing casing, a commutator, a brush supporting bracket carried by the casing, and means on the bracket for adjusting the position of the brushes on the commutator.

10. In a machine of the class described, the combination of an enclosing casing, a commutator, a circumferentially adjustable brush supporting bracket carried by the casing, and means on the bracket, for adjusting the position of the brushes with respect to one another.

11. A dynamo-electric machine comprising a frame, a rotor member mounted in said frame, a commutator cylinder carried by said rotor, a circumferentially adjustable bracket carried by said frame and a brushholder carried by said bracket and circumferentially adjustable with respect thereto.

12. A dynamo-electric machine comprising a frame, a rotor member mounted in said frame, a commutator cylinder carried by said rotor, a circumferentially adjustable and radially movable bracket carried by said frame, and a brushholder carried by said bracket and circumferentially movable with respect thereto.

13. A dynamo-electric machine comprising a frame, a rotor member mounted in said frame, a commutator cylinder carried by said rotor, a circumferentially adjustable bracket carried by said frame, said bracket comprising a plurality of parts hinged together for radial movement, and a plurality of brushholders carried by said bracket for co-operation with said commutator cylinder.

one of said brushholders being circumferentially adjustable with respect to said bracket.

14. A dynamo-electric machine comprising a frame, a rotor member mounted in said frame, a commutator cylinder carried by said rotor, a two-part circumferentially adjustable bracket surrounding the end portion of said frame and in frictional contact therewith, and a plurality of brushholders carried by said bracket for co-operation with said commutator cylinder.

In testimony whereof, I have hereunto subscribed my name this 25th day of June, 1920.

JOHN E. TROSTLE.